(12) United States Patent
Burks et al.

(10) Patent No.: US 10,908,881 B2
(45) Date of Patent: Feb. 2, 2021

(54) SYSTEM AND COMPUTER-IMPLEMENTED METHOD FOR BIDIRECTIONAL TRANSLATION BETWEEN DIAGRAMMING AND IMPLEMENTATION TOOLS

(71) Applicant: Mastercard International Incorporated, Purchase, NY (US)

(72) Inventors: Elwood Scott Burks, Cottleville, MO (US); Brian Christopher Loeffler, Wright City, MO (US)

(73) Assignee: Mastercard International Incorporated, Purchase, NY (US)

( * ) Notice: Subject to any disclaimer, the term of this patent is extended or adjusted under 35 U.S.C. 154(b) by 32 days.

(21) Appl. No.: 16/023,948

(22) Filed: Jun. 29, 2018

(65) Prior Publication Data

US 2020/0004511 A1    Jan. 2, 2020

(51) Int. Cl.
| | | |
|---|---|---|
| *G06F 9/44* | (2018.01) | |
| *G06F 8/34* | (2018.01) | |
| *G06F 8/52* | (2018.01) | |
| *G06F 16/904* | (2019.01) | |

(52) U.S. Cl.
CPC ............... *G06F 8/34* (2013.01); *G06F 8/52* (2013.01); *G06F 16/904* (2019.01)

(58) Field of Classification Search
None
See application file for complete search history.

(56) References Cited

U.S. PATENT DOCUMENTS

| | | | | |
|---|---|---|---|---|
| 5,911,070 | A * | 6/1999 | Solton | G06F 8/34 717/105 |
| 9,195,445 | B1 * | 11/2015 | Shakeri | G06F 9/5044 |
| 2005/0283758 | A1 * | 12/2005 | Cobcroft | G06F 8/34 717/113 |
| 2006/0271849 | A1 * | 11/2006 | Thormaehlen | G06F 8/10 715/202 |
| 2009/0055364 | A1 * | 2/2009 | Mandadi | G06F 16/24526 |
| 2009/0063956 | A1 * | 3/2009 | Vidyarthi | G06F 16/258 715/239 |
| 2012/0124552 | A1 * | 5/2012 | Lin | G06F 8/10 717/107 |

(Continued)

*Primary Examiner* — Insun Kang
(74) *Attorney, Agent, or Firm* — Hovey Williams LLP

(57) ABSTRACT

A system and computer-implemented method for translating diagramming data from a diagramming tool into implementation data for direct implementation by an implementation tool for implementing a component, and for translating the implementation data back into the diagramming data for direct visualization by the diagramming tool. The diagramming tool generates the diagramming data. A translating tool receives the diagramming data, reads, validates, and translates it directly into the implementation data, and saves the implementation data in an export file. The implementation tool receives the export file and uses the implementation data to implement the component. The translating tool can also translate the implementation data directly back into the diagramming data, and save the diagramming data in an import file. The diagramming tool receives the import file and uses the diagramming data to visualize the diagram of the component. The component may be physical or virtual, and part of information technology infrastructure.

14 Claims, 3 Drawing Sheets

(56) References Cited

U.S. PATENT DOCUMENTS

Figure 1:
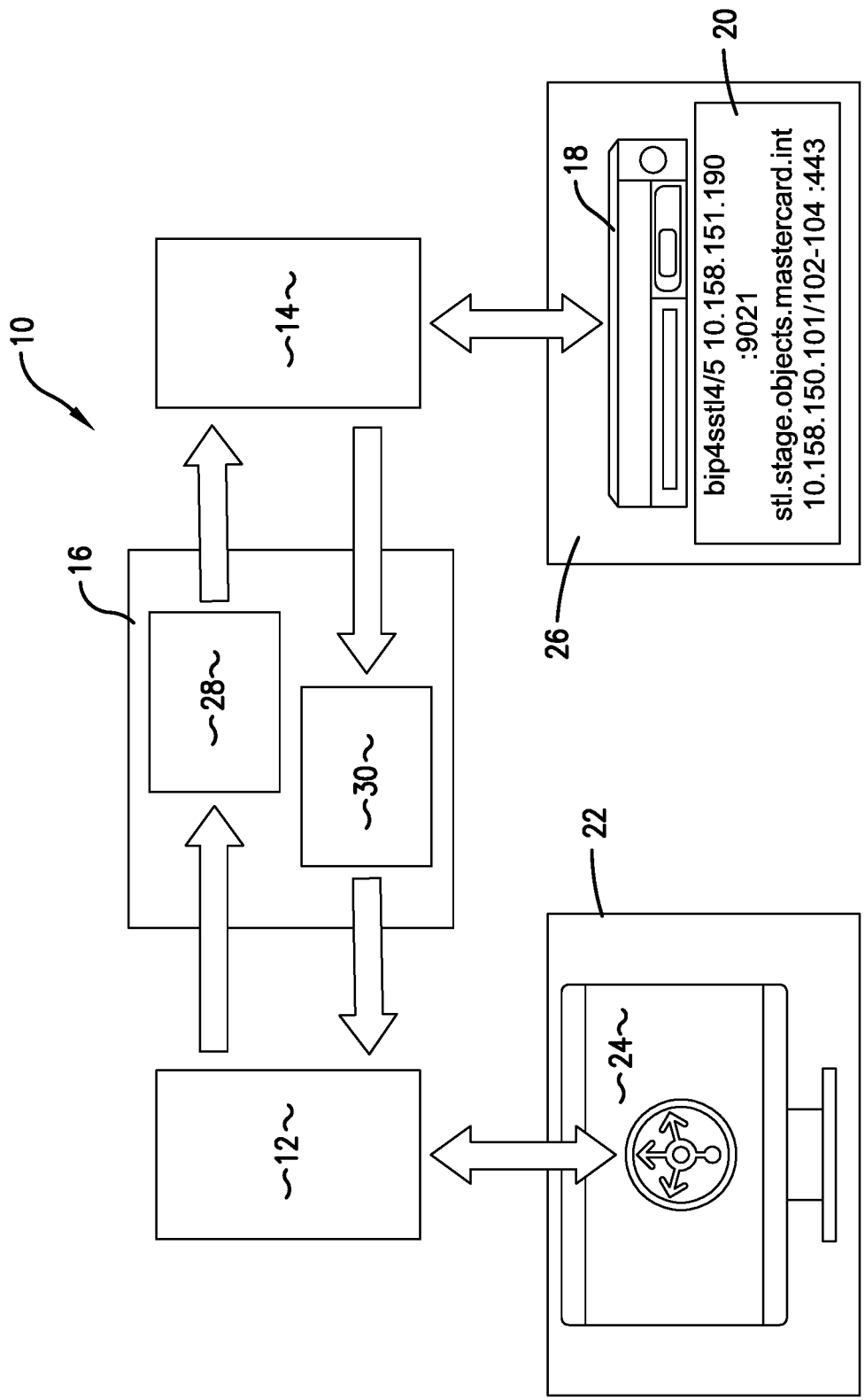

| | | | | |
|---|---|---|---|---|
| 2012/0272213 | A1* | 10/2012 | Torgerson | G06F 8/38 |
| | | | | 717/110 |
| 2012/0331444 | A1* | 12/2012 | Szpak | G06F 8/10 |
| | | | | 717/105 |
| 2013/0219362 | A1* | 8/2013 | Cai | G06N 5/00 |
| | | | | 717/123 |
| 2014/0200871 | A1* | 7/2014 | Grace | G06F 8/34 |
| | | | | 703/6 |
| 2014/0359560 | A1* | 12/2014 | Avadhanula | G06F 8/35 |
| | | | | 717/105 |
| 2014/0380269 | A1* | 12/2014 | Conrad | G06F 8/35 |
| | | | | 717/104 |
| 2015/0033207 | A1* | 1/2015 | Fung | G06F 11/3664 |
| | | | | 717/124 |
| 2015/0100945 | A1* | 4/2015 | Nadar | G06F 8/71 |
| | | | | 717/121 |
| 2015/0220311 | A1* | 8/2015 | Salter | G06F 8/34 |
| | | | | 717/105 |
| 2015/0331785 | A1* | 11/2015 | Schultz | G06F 17/212 |
| | | | | 717/125 |
| 2016/0170720 | A1* | 6/2016 | Xue | G06F 8/34 |
| | | | | 717/113 |
| 2016/0259630 | A1* | 9/2016 | Roos | G06F 8/35 |
| 2017/0060541 | A1* | 3/2017 | Saleh | G06F 8/34 |
| 2019/0156543 | A1* | 5/2019 | Zawaideh | G06T 11/60 |
| 2019/0278831 | A1* | 9/2019 | Priyadarshini | H04L 67/2823 |

* cited by examiner

Manage Master Shape for All environments

F5-DMZ4:

| Property | Environment: | <Environment> | Prod-Stl | Prod-Ksc | Stage | Dev |
|---|---|---|---|---|---|---|
| Device | | <Device> | bip2stl4/5 | bip2kscl4/5 | bip4stl4/5 | N/A |
| export | | ☐ | ☑ | ☐ | ☑ | ☐ |
| Cluster | | <Cluster> | bip2stl4.master | | bip4stl4.master | |
| Name | | <DNS Name> | stl.prod.object | .mastercard.in | stl.stage.object | |
| base_name | | <base_name> | prod.stage.ob | | stage.objects | |
| template | | f5/generic/tcp | F5 Template to use from Git | | | |
| certenvs | | # | 2 | 2 | 4 | 0 |
| ServiceLineT | | | HTTPS | | HTTPS | |
| NewDNS | | ☐ | ☐ | ☐ | ☐ | ☐ |
| IP | | <Outside IP> | 10.154.151.19 | 10.150.151.19 | 10.158.151.19 | |
| NewIP | | ☐ | ☐ | ☐ | ☐ | ☐ |
| IPv6 | | <Outside IPv6> | | | | |
| NewIPv6 | | ☐ | ☐ | ☐ | ☐ | ☐ |
| OutsidePort | | <Port> | 9021 | 16xxx | 9021 | |
| NewOutsideP | | ☐ | ☐ | ☐ | ☐ | ☐ |
| primary | | <LB IPs> | 10.154.150.10/ | 10.15 | 10.158.150.101 | 10.158 |
| backup | | <backup IPs> | | | 10.157.144.10/ | 10.158 |
| NewInsideP | | ☐ | ☐ | ☐ | ☐ | ☐ |
| InsidePort | | <inside port> | | | 443 | |
| NewInsidePor | | ☐ | ☐ | ☐ | ☐ | ☐ |
| New | | ☑ | ☑ | ☑ | ☑ | ☐ |
| TBD | | ☑ | ☑ | ☑ | ☑ | ☐ |
| Segment | | ▼ | Network Segment (VLAN#) | | | |
| SourceIP | | <Src/fwGrp> | fw-grp-xxx | fw-grp-xxx | fw-grp-xxx | |
| HideClientCer | | ☑ | Turn On/Off the display of the Client cert | | | |
| HideServerCe | | ☑ | Turn On/Off the display of the Server cert | | | |

OK    Cancel

Fig. 2.

SYSTEM AND COMPUTER-IMPLEMENTED METHOD FOR BIDIRECTIONAL TRANSLATION BETWEEN DIAGRAMMING AND IMPLEMENTATION TOOLS

FIELD

The present invention relates to systems and methods for diagramming and implementing individual components and partial or complete systems. More particularly, embodiments of the invention concern a system and computer-implemented method for translating diagramming data from a diagramming tool into implementation data for direct implementation by an implementation tool for implementing physical or virtual components or systems, and for translating the implementation data back into the diagramming data for direct visualization by the diagramming tool.

BACKGROUND

Software tools, such as Microsoft Visio, facilitate the creation of diagrams of components, subsystems, and entire systems, whether physical or virtual in nature. Typically, these tools offer a wide variety of built-in shapes, objects, and stencils with which to work. Users are also able to make their own shapes, objects, and stencils, and import them. For example, Visio allows users to build custom stencils with any attributes needed to describe a component. However, Visio does not provide an ability to read, validate, and custom output the diagrammatical data into an implementable artifact. The Visio diagram can be viewed, and the attributes can be viewed, but substantial effort is required to manually read, transfer, and use the diagrammatical data to actually implement the diagrammed component. Further, errors can be introduced during this manual process, which can significantly increase the time and cost needed to implement the component.

It is known for some tools, such as PowerShell, to use Visio to create Visio diagrams dynamically, and it is known to tie such diagrams to data sources so that the diagrams are dynamically updated (with regard to, e.g., charts and color coding) as the data sources are updated outside Visio. It is also known to dump values from Visio, but these values have no inherent meaning and cannot be used directly.

This background discussion is intended to provide information related to the present invention which is not necessarily prior art.

SUMMARY

Embodiments address the above-described and other problems by providing a system and computer-implemented method for translating diagramming data from a diagramming tool into implementation data for direct implementation by an implementation tool for implementing physical or virtual components or systems, and for translating the implementation data back into the diagramming data for direct visualization by the diagramming tool.

In a first embodiment, a system is provided for translating diagramming data into implementation data. The system may broadly comprise a diagramming tool, a translating tool, and an implementation tool. The diagramming tool may be configured to generate the diagramming data for a diagram of at least one component of a system. The translating tool may be configured to receive the diagramming data, read and validate the diagramming data, translate the diagramming data directly into implementation data, save the implementation data in an electronic export file, and electronically communicate the electronic export file. The implementation tool may be configured to receive the electronic export file and use the implementation data in the electronic export file to implement the component.

Various implementations of the first embodiment may include any one or more of the following features. The translating tool may be further configured to translate the implementation data directly back into the diagramming data, save the diagramming data in an electronic import file, and electronically communicate the electronic import file to the diagramming tool; and the diagramming tool may be further configured to receive the electronic import file and use the diagramming data in the electronic import file to visualize the diagram of the component. The component may be a physical component or a virtual component, and the component may be part of an information technology infrastructure. The implementation tool may be further configured to perform an additional validation of the implementation data prior to using the implementation data to implement the component. The diagramming data may include attribute data for the component, and the translating tool may be further configured to define definitions for the attribute data across a plurality of environments, and display the attribute data based on a specific environment of the plurality of environments, and the translating tool may be further configured to provide a data entry interface to facilitate entering the attribute data for the plurality of environments, and facilitate viewing the attribute data for the plurality of environments.

In a second embodiment, a computer-implemented method is provided for improving the function of a computer for translating diagramming data from a diagramming software tool into implementation data for direct implementation by an implementation software tool. The computer-implemented method may broadly comprise the following. The diagramming software tool may generate the diagramming data for a diagram of at least one component of a system. A translating software tool running on the computer may receive the diagramming data from the diagramming software tool for a diagram of at least one component of a system. The translating software tool may read and validate the diagramming data, translate the diagramming data directly into the implementation data, save the implementation data in an electronic export file, and electronically communicate the electronic export file to the implementation software tool. The implementation software tool may receive the electronic export file and use the implementation data to implement the component.

Various implementations of the second embodiment may include any one or more of the following features. The translating software tool may further receive the implementation data from the implementation software tool, translate the implementation data directly back into the diagramming data, save the diagramming data in an electronic import file, and electronically communicate the electronic import file to the diagramming software tool; and the diagramming software tool may receive the electronic import file and use the diagramming data in the electronic import file to visualize the diagram of the component. The component may be a physical component or a virtual component, and the component may be part of an information technology infrastructure. The electronic export file may be checked into a source code system to be picked by the implementation software tool. The implementation software tool may further perform an additional validation of the implementation data prior to using the implementation data to implement the component.

The diagramming data may include attribute data for the component, and the translating software tool may further define definitions for the attribute data across a plurality of environments, and display the attribute data based on a specific environment of the plurality of environments, and the translating software tool may further provide a data entry interface to facilitate entering the attribute data for the plurality of environments, and facilitate viewing the attribute data for the plurality of environments.

This summary is not intended to identify essential features of the present invention, and is not intended to be used to limit the scope of the claims. These and other aspects of the present invention are described below in greater detail.

DRAWINGS

Figure 3:
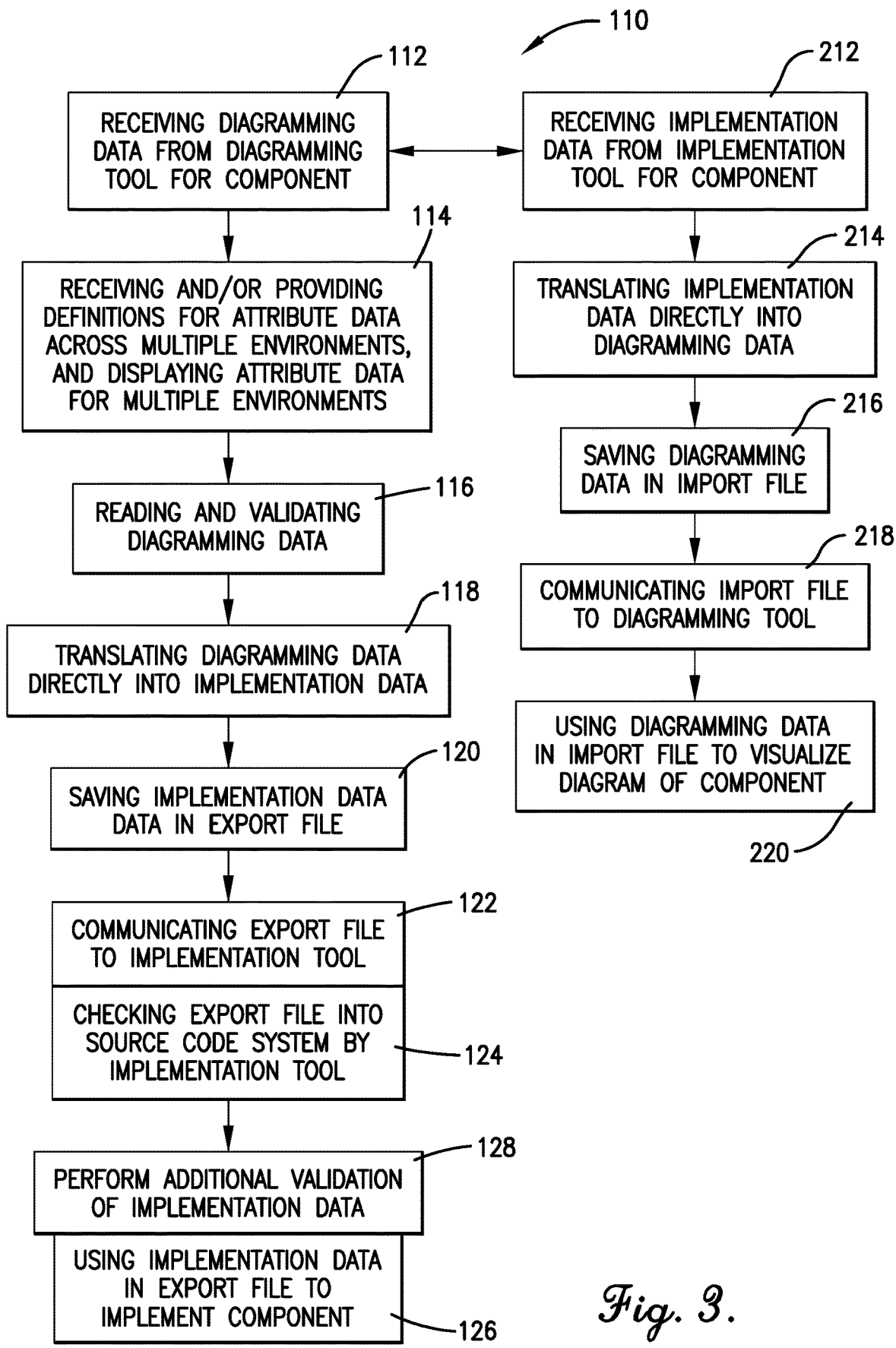

Embodiments of the present invention are described in detail below with reference to the attached drawing figures, wherein:

FIG. 1 is a diagram of an embodiment of a system for bidirectionally translating data between a diagramming tool and an implementing tool; and FIG. 2 is a depiction of an exemplary data entry form for an exemplary component which may be diagrammed and implemented by the system of FIG. 1; and FIG. 3 is a flowchart of steps in a computer-implemented method for bidirectionally translating data between a diagramming tool and an implementing tool.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment," "an embodiment," or "embodiments" mean that the feature or features referred to are included in at least one embodiment of the invention. Separate references to "one embodiment," "an embodiment," or "embodiments" in this description do not necessarily refer to the same embodiment and are not mutually exclusive unless so stated. Specifically, a feature, component, action, step, etc. described in one embodiment may also be included in other embodiments, but is not necessarily included. Thus, particular implementations of the present invention can include a variety of combinations and/or integrations of the embodiments described herein.

Broadly characterized, embodiments concern a system and computer-implemented method for translating diagramming data from a diagramming tool into implementation data for direct implementation by an implementation tool for implementing physical or virtual components or systems, and for translating the implementation data back into the diagramming data for direct visualization by the diagramming tool. In more detail, embodiments may be configured to substantially automatically read, validate, and customize output diagramming data from a diagramming tool into a directly implementable export file which may be used as input to an implementation tool for implementing the diagrammed component, subsystem, or system, and when desired to reimport the export file into the diagramming tool for visualizing the implemented system (i.e., embodiments provide for bidirectionally translating between and creating implementable files from diagrams and diagrams from implementable files).

More specifically, embodiments allow for exporting a directly implementable design file (e.g., a data or configuration file) from a design tool (e.g., software such as Visio) as machine readable code to an automated implementation tool (e.g., software such as VRA, VMware, VRealize) to build the diagrammed component or system, and further allow for subsequently reimporting the design file for revisualization in the design tool. The components or systems may be physical and/or virtual in nature, and may, in one exemplary application, be part of an information technology infrastructure. Embodiments may include automatically checking the export file into a source code system to be picked by the automation tool. This may be accomplished by an integrated source code tool.

Thus, embodiments allow the system to be implemented exactly as diagrammed, using the automation tooling/pipeline to do any additional validations. Embodiments advantageously eliminate the additional effort and risk of errors associated with prior art methods of manually reading, transferring, and using the diagrammatical data to implement the diagrammed system.

Referring to FIG. 1, an embodiment of a system 10 is shown for translating diagramming data from a diagramming tool into implementation data for direct implementation by an implementation tool for implementing a physical or virtual component or system. The system may broadly comprise the diagramming tool 12, the implementation tool 14, and a translation tool 16. The diagramming tool 12 may be configured to facilitate diagramming at least one component 18 of a system, wherein the component 18 may be defined at least in part by an attribute 20, including creating corresponding diagramming data. In an exemplary application, the system may be, e.g., IT infrastructure, and the component 18 may be, e.g., a physical or virtual load balancer or server. The diagramming tool 12 may take the form of a software product (e.g., Visio) running on a first computing device 22 including a display device 24.

The implementation tool 14 may be configured to facilitate implementing the component 18 in accordance with the attribute 20, including creating corresponding implementation data. The implementation tool 14 may take the form of a software product (e.g., VRA, VMware, VRealize) running on a second computing device 26 which may be part of a computer-controlled manufacturing device. In alternative implementations, the first and second computing devices 22,26 may be the same device or different devices.

The translation tool 16 may be configured to electronically receive the diagramming data from the diagramming tool 12, translate the diagramming data directly into implementation data; save the implementation data in an electronic export file 28, and electronically communicate the electronic export file 28 to the implementation tool 14 for implementation. The translation tool 16 may be further configured to electronically receive the implementation data from the implementing tool 14, translate the implementation data directly back into the diagramming data, save the diagramming data in an electronic import file 30, and electronically communicate the electronic import file 30 to the diagramming tool 12 for visualization. The translation tool 16 may take the form of software running on the first or second computing devices 22,26 or on a third computing device.

Referring to FIG. 2, an exemplary data entry form or interface is shown 32. The illustrated form 32 was built from an exemplary Visio stencil, and so other forms based on other stencils may vary. The exemplary stencil—specifically, a technical architecture document (TAD))—represents an exemplary F5 load balancer component, and behind the stencil are standard Visio attributes. The data entry form 32 may facilitate inputting data to define attributes across multiple environments 34A,34B,34C,34D, and may change the display of the data based on a tab name representing a specific environment (such as "development," "stage," or "production"). The data entry form 32 may simultaneously display all or substantially all of the data for each environment, thereby advantageously providing the data in one location for more efficient validation. Many attributes that are used in the export file 28 can be created to "tag" a great number of things that may or may not be displayed in the actual diagram. Different components may be implemented by different automation tools, so the export files for different components may have different formats. For example, the export files for load balancers may be .xml files, while the export files for servers may be .json files. Thus, embodiments may allow for creating custom export file formats as needed.

In the exemplary context of creating information technology infrastructure, exemplary component attributes which may be exported from Visio TADs may include primary network/mask, backup network/mask, number of disks, size of each disk, hostname, central processing unit (CPU), memory, and configuration management database (CMDB) attributes (including Enterprise Service Framework metadata values). Similarly, exemplary application server (Apache Tomcat server) stretch attributes which may be exported from Visio TADs may include Java virtual machine (JVM) name, JVM port range/offset, JVM heap size minimum/maximum, JVM data source pool minimum/maximum. In addition to servers (e.g., Windows or Linux servers) containing actual operating systems (OSs) and web middleware, the export files may provide inputs for building out load balancers (e.g., F5 Big IP load balancers), Linux servers containing Apache HTTP Server (Web Server), Apache Tomcat (Java Virtual Machine/application server), PostgreSQL (Relational Database Management System/RDBMS), Oracle Server (Relational Database Management System/RDBMS), SSL (Secure Sockets Layer) or Digital Certificates, and/or the application code (Enterprise Application aRchive/EAR files & Web Application Resource/WAR files). Additionally, network connectivity firewall rules may be exported from Visio. These may include rules to be applied to a software defined network (SDN), such as source and destination targets specified via software defined tags to allow communication between entities across network boundaries.

In operation, the system 10 may function substantially as follows. The diagramming software tool 12 running on the first computing device 22 may generate the diagramming data for the diagram of the component 18 (of, e.g., information technology infrastructure). The diagramming data may include the attribute data 20. Referring also to FIG. 3, the translating software tool 16 may receive the diagramming data, as shown in 112, read and validate the diagramming data, as shown in 116, translate the diagramming data directly into the implementation data, as shown in 118, save the implementation data in the electronic export file 28, as shown in 120, and electronically communicate the electronic export file 28 to the implementation software tool 14, as shown in 122. The implementation software tool 14 running on the second computing device 26 may receive the electronic export file 28 and use the implementation data in the electronic export file 28 to implement the component 18, as shown in 126.

Further, the translating software tool 16 may receive the implementation data from the implementation tool 14, as shown in 212, translate the implementation data directly back into the diagramming data, as shown in 214, save the diagramming data in the electronic import file 30, as shown in 216, and electronically communicate the electronic import file 30 to the diagramming software tool 12, as shown in 218. The diagramming software tool 12 may receive the electronic import file 30 and use the diagramming data in the electronic import file 30 to visualize the diagram of the component 18, as shown in 220. Additionally, the translating software tool 12 may define definitions for the attribute data across a plurality of environments, and may display the attribute data based on a specific environment of the plurality of environments, and may provide a data entry for or interface 32 to facilitate entering the attribute data for the plurality of environments, and facilitate viewing the attribute data for the plurality of environments, as shown in 114.

The system 10 may include more, fewer, or alternative components and/or perform more, fewer, or alternative actions, including those discussed elsewhere herein, and particularly those discussed in the following section describing the computer-implemented method.

Referring again to FIG. 3, an embodiment of a computer-implemented method 110 is shown for translating diagramming data from a diagramming tool into implementation data for direct implementation by an implementation tool for implementing a physical or virtual component or system. The method 110 may be a corollary to the functionality of the above-described system 10, and may be similarly implemented using the various components of the system 10 within the above-described exemplary operating environments. Broadly, the method 110 may proceed as follows.

Diagramming data from a diagramming tool 12 may be received for a diagram of at least one component 18 of a system, as shown in 112. The component 18 may be a physical or a virtual component, and may be part of an, e.g., information technology infrastructure. The diagramming data may include attribute data 20 for the component 18, and embodiments may include receiving and/or providing definitions for the attribute data across a plurality of environments 34A,34B,34C,34D, and displaying the attribute data for the plurality of environments, as shown in 114. Relatedly, embodiments may include providing a data entry form or other interface 32 to facilitate entering the attribute data for the plurality of environments 34A,34B,34C,34D, and to facilitate viewing the attribute data for the plurality of environments.

The diagramming data may be read and validated, as shown in 116. The diagramming data may be translated directly into implementation data, as shown in 118. The implementation data may be represented as machine readable code which is readable by an implementation tool 14. The implementation data may be saved in an electronic export file 28, as shown in 120. The electronic export file may be electronically communicated to the implementation tool 14, as shown in 122. This may include checking the electronic export file 28 into a source code system specified by the implementation tool, as shown in 124. The implementation data in the electronic export file 28 may be used to implement the component 18 of the system, as shown in 126. This may include performing an additional validation of the implementation data prior to using it, as shown in 128.

As desired or needed, the translation process may be reversed. Implementation data from the implementation tool 14 may be received for the component 18, as shown in 212. The implementation data may be translated directly back into the diagramming data, as shown in 214. The diagramming data may be saved in an electronic import file 30, as shown in 216. The electronic import file 30 may be electronically communicated to the diagramming tool 12, as shown in 218. The diagramming data in the electronic import file 30 may be used to visualize the diagram of the component 18, as shown in 220.

The computer-implemented method 110 may include more, fewer, or alternative actions, including those discussed elsewhere herein.

Any actions, functions, steps, and the like recited herein may be performed in the order shown in the figures and/or described above, or may be performed in a different order. Furthermore, some steps may be performed concurrently as opposed to sequentially. Although the computer-implemented method is described above, for the purpose of illustration, as being executed by an exemplary system and/or exemplary physical elements, it will be understood that the performance of any one or more of such actions may be differently distributed without departing from the spirit of the present invention.

A computer-readable medium comprising a non-transitory medium may include an executable computer program stored thereon and for instructing one or more processing elements to perform some or all of the steps described herein, including some or all of the steps of the computer-implemented method. The computer program stored on the computer-readable medium may instruct the processing element and/or other components of the system to perform additional, fewer, or alternative actions, including those discussed elsewhere herein.

All terms used herein are to be broadly interpreted unless otherwise stated. For example, the term "payment card" and the like may, unless otherwise stated, broadly refer to substantially any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, and/or computers. Each type of transaction card can be used as a method of payment for performing a transaction.

The terms "processing element," "processor," and the like, as used herein, may, unless otherwise stated, broadly refer to any programmable system including systems using central processing units, microprocessors, microcontrollers, reduced instruction set circuits (RISC), application specific integrated circuits (ASIC), logic circuits, and any other circuit or processor capable of executing the functions described herein. The above examples are example only, and are thus not intended to limit in any way the definition and/or meaning of the term "processing element." In particular, "a processing element" may include one or more processing elements individually or collectively performing the described functions. In addition, the terms "software," "computer program," and the like, may, unless otherwise stated, broadly refer to any executable code stored in memory for execution on mobile devices, clusters, personal computers, workstations, clients, servers, and a processor or wherein the memory includes read-only memory (ROM), electronic programmable read-only memory (EPROM), random access memory (RAM), erasable electronic programmable read-only memory (EEPROM), and non-volatile RAM (NVRAM) memory. The above memory types are exemplary only, and are thus not limiting as to the types of memory usable for storage of a computer program.

The terms "computer," "computing device," and the like, as used herein, may, unless otherwise stated, broadly refer to substantially any suitable technology for processing information, including executing software, and may not be limited to integrated circuits referred to in the art as a computer, but may broadly refer to a microcontroller, a microcomputer, a programmable logic controller (PLC), an application specific integrated circuit, and other programmable circuits, and these terms are used interchangeably herein.

The term "communications network" and the like, as used herein, may, unless otherwise stated, broadly refer to substantially any suitable technology for facilitating communications (e.g., GSM, CDMA, TDMA, WCDMA, LTE, EDGE, OFDM, GPRS, EV-DO, UWB, WiFi, IEEE 802 including Ethernet, WiMAX, and/or others), including supporting various local area networks (LANs), personal area networks (PAN), or short range communications protocols.

The term "communications element" and the like, as used herein, may, unless otherwise stated, broadly refer to substantially any suitable technology for facilitating communications, and may include one or more transceivers (e.g., WWAN, WLAN, and/or WPAN transceivers) functioning in accordance with IEEE standards, 3GPP standards, or other standards, and configured to receive and transmit signals via a communications network.

The term "memory element," "data storage device," and the like, as used herein, may, unless otherwise stated, broadly refer to substantially any suitable technology for storing information, and may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A system for translating diagramming data into implementation data, the system comprising:
   a first computing device including a diagramming tool configured to generate the diagramming data for a representative visual diagram of at least one physical component of a system;
   a translating tool configured to—
      receive the diagramming data,
      read and validate the diagramming data,
      translate the diagramming data directly into the implementation data,
      save the implementation data in an electronic export file, and
      electronically communicate the electronic export file; and a second computing device including an implementation tool configured to receive the electronic export file and use the implementation data in the electronic export file to implement the at least one physical component, said translating tool is further configured to—
translate the implementation data directly back into the diagramming data,
save the diagramming data in an electronic import file,
electronically communicate the electronic import file to the diagramming tool, said diagramming tool is further configured to receive the electronic import file and, based on the diagramming data in the electronic import file, display the representative visual diagram of the at least one physical component.

2. The system of claim 1, wherein the at least one physical component is part of an information technology infrastructure.

3. The system of claim 1, wherein the implementation tool is further configured to perform an additional validation of the implementation data prior to using the implementation data to physically implement the at least one physical component.

4. The system claim 1, wherein the diagramming data includes attribute data for the at least one physical component.

5. The system of claim 4, wherein the translating tool is further configured to—
define definitions for the attribute data across a plurality of environments, and display the attribute data based on a specific environment of the plurality of environments; and
provide a data entry interface to facilitate entering the attribute data for the plurality of environments, and facilitate viewing the attribute data for the plurality of environments.

6. A system for bidirectionally translating between diagramming data from a diagramming software tool and implementation data for an implementation software tool, the system comprising:
the diagramming software tool running on a first computing device, and configured to generate the diagramming data for a representative visual diagram for at least one physical component of an information technology infrastructure, wherein the diagramming data includes attribute data;
a translating software tool configured to—
receive the diagramming data,
read and validate the diagramming data,
translate the diagramming data directly into the implementation data,
save the implementation data in an electronic export file, and
electronically communicate the electronic export file to the implementation software tool;
the implementation software tool running on a second computing device configured to receive the electronic export file and use the implementation data in the electronic export file to implement the at least one physical component;
the translating software tool further configured to—
translate the implementation data directly back into the diagramming data;
save the diagramming data in an electronic import file;
electronically communicate the electronic import file to the diagramming software tool;
the diagramming software tool further configured to receive the electronic import file and use the diagramming data in the electronic import file to display the representative visual diagram for the at least one physical component; and
the translating software tool further configured to—
define definitions for the attribute data across a plurality of environments, and display the attribute data based on a specific environment of the plurality of environments, and
provide a data entry interface to facilitate entering the attribute data for the plurality of environments, and facilitate viewing the attribute data for the plurality of environments.

7. The system of claim 6, wherein the second computing device is a computer-controlled manufacturing device.

8. The system of claim 6, wherein the implementation software tool is further configured to perform an additional validation of the implementation data prior to using the implementation data to implement the at least one physical component.

9. A computer-implemented method for improving the function of a computer for translating diagramming data from a diagramming software tool into implementation data for direct implementation by an implementation software tool, the computer-implemented method comprising:
generating by the diagramming software tool the diagramming data for a representative visual diagram of at least one physical component of a system;
receiving by a translating software tool running on the computer the diagramming data from the diagramming software tool for the representative visual diagram of the at least one physical component of the system;
reading and validating by the translating software tool the diagramming data;
translating by the translating software tool the diagramming data directly into the implementation data;
saving by the translating software tool the implementation data in an electronic export file;
electronically communicating by the translating software tool the electronic export file to the implementation software tool;
receiving and using by the implementation software tool the implementation data in the electronic export file to implement the at least one physical component;
receiving by the translating software tool the implementation data from the implementation software tool;
translating by the translating software tool the implementation data directly back into the diagramming data;
saving by the translating software tool the diagramming data in an electronic import file;
electronically communicating by the translating software tool the electronic import file to the diagramming software tool; and
receiving by the diagramming software tool the diagramming data in the electronic import file and, based on the diagramming data, displaying the representative visual diagram of the at least one physical component.

10. The computer-implemented method of claim 9, wherein the at least one physical component is part of an information technology infrastructure.

11. The computer-implemented method of claim 9, further including checking the electronic export file into a source code system to be picked by the implementation software tool.

12. The computer-implemented method of claim 9, further including performing by the implementation software tool an additional validation of the implementation data prior to using the implementation data to implement the at least one physical component.

13. The computer-implemented method of claim 9, wherein the diagramming data includes attribute data for the at least one physical component.

14. The computer-implemented method of claim 13, further including—
- defining by the translating software tool definitions for the attribute data across a plurality of environments, and displaying the attribute data based on a specific environment of the plurality of environments; and
- providing by the translating software tool a data entry interface to facilitate entering the attribute data for the plurality of environments, and to facilitate viewing the attribute data for the plurality of environments.

\* \* \* \* \*